Nov. 21, 1967    C. W. PATTEN, JR., ETAL    3,353,370
MOVABLE, CLOSED-LOOP CRYOGENIC SYSTEM
Filed April 12, 1966    3 Sheets-Sheet 1

INVENTORS.
CARL W. PATTEN, Jr.
JOHN P. WENKER
KENNETH B. CRAIG
BY
Dominich Nardelli
ATTORNEY

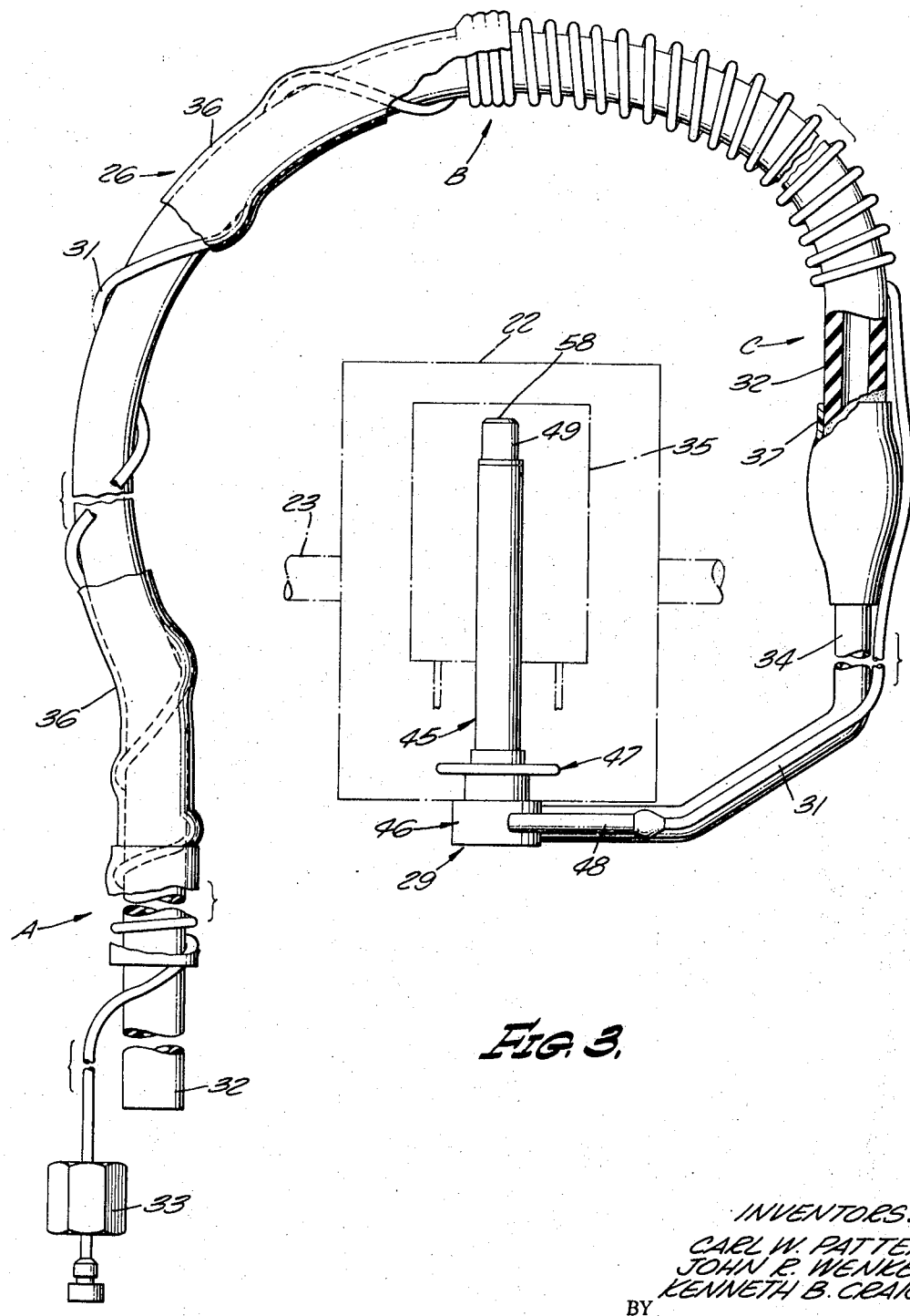

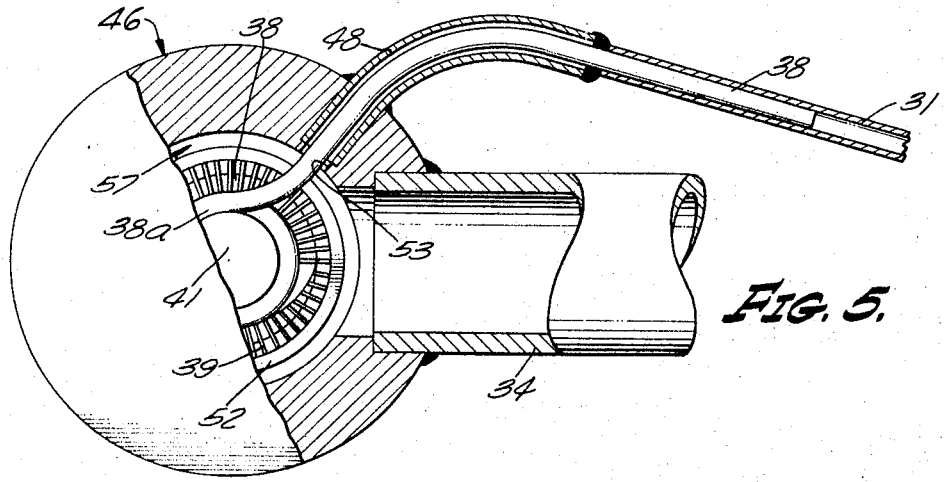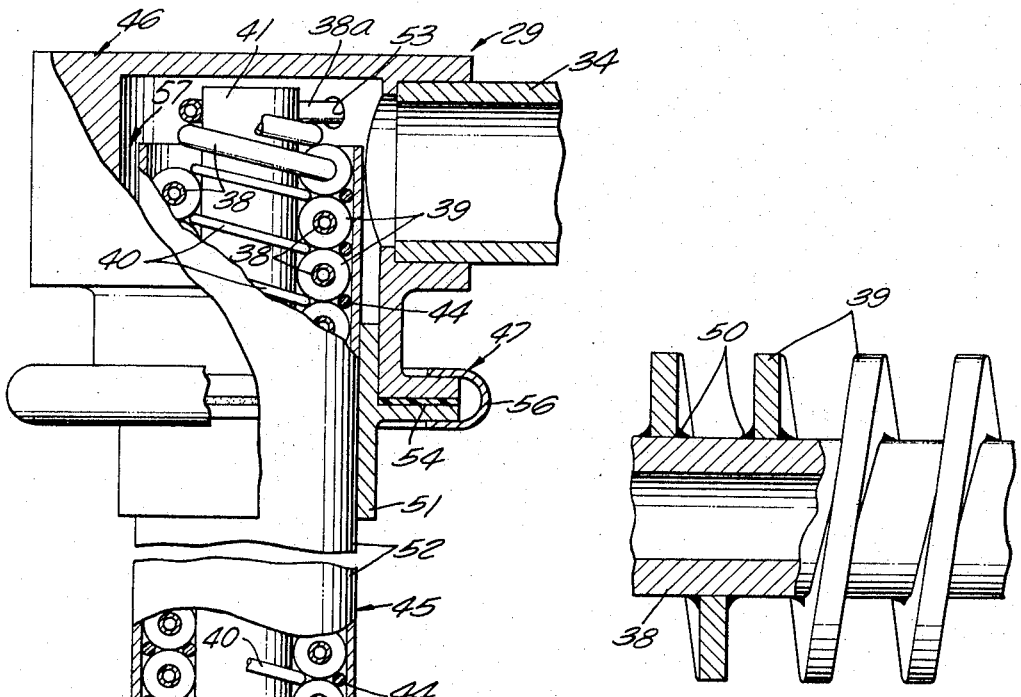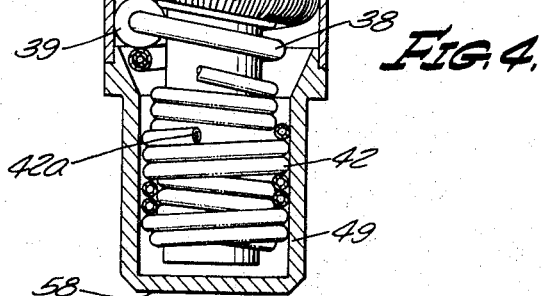

United States Patent Office 3,353,370
Patented Nov. 21, 1967

3,353,370
MOVABLE, CLOSED-LOOP CRYOGENIC SYSTEM
Carl W. Patten, Jr., and John Richard Wenker, Torrance, and Kenneth B. Craig, Lawndale, Calif., assignors to The Garrett Corporation, Los Angeles, Calif., a corporation of California
Filed Apr. 12, 1966, Ser. No. 542,016
16 Claims. (Cl. 62—514)

ABSTRACT OF THE DISCLOSURE

A closed-loop cryogenic apparatus having a fixed compressor and a movable compact cryostat connected by flexible lines.

---

This invention relates to a cryogenic apparatus and, more particularly, to a closed-loop cryogenic apparatus which transfers a refrigerant from a fixed compressor to a movable cryostat and back to the fixed compressor.

In infrared radiation detection devices, the infrared detection element therein is maintained at extremely low temperatures with liquefied gas, such as, liquid nitrogen, to increase the signal to noise ratio. Up to now, the liquid nitrogen had to be held in a specially constructed container to reduce wasteful loss of the fluid through evaporation. In addition, the detection element and the liquid gas container are required to be supported on a gimbal so that the element is able to rotate through a solid angle of, for example, one-hundred-and-twenty degrees, to measure the intensity of the infrared rays radiating from different points. Obviously, the complete package was large and cumbersome. In some other applications the liquid gas container was not supported on the gimbal along with the detection device and in these applications the liquid gas would be piped through a flexible tube to the movable infrared detection device. However, in these latter applications, the efficiency was low because the flexible tube could not be heavily insulated if the tube was to be flexible to provide 120° rotation and small in size to provide utility.

Briefly, the present invention, provides a closed-loop system wherein nitrogen is compressed by a compressor which is removed from the detection device. The high pressure nitrogen is piped at ambient temperature by a metal tube to the detection device. Inside the device a standard infrared detection element is mounted on a gimbal along with a specially constructed expansion valve or cryostat. The metal tube, after it enters the device, is helically wound to provide flexibility thereto and then coupled to the expansion valve. In the expansion valve the high pressure nitrogen expands and liquefies to maintain the detection element at a very low temperature. The expansion valve is made sufficiently small and compact, so that in turn the detection device is compact. However, the expansion valve has sufficient heat transfer area so that the incoming nitrogen is cooled and liquefied by expansion providing the very low temperature for the detection element. The low pressure nitrogen is conducted away from the expansion valve by a resilient flexible hose which is disposed within the helically wound metal tube. The helically wound metal tube and the resilient flexible hose provide mutual support for each other and are combined with the specially constructed, compact expansion valve so that flexibility, compactness, and high efficiency are achieved in the detection device without appreciably affecting the inertia, center of gravity, and flexibility of the gimbal.

Accordingly, an object of this invention is to provide a flexible and compact refrigerated infrared detection device having relatively high efficiency.

Another object of this invention is to provide a closed-loop refrigeration system for a flexible detection device without requiring bulky insulation.

Another object of this invention is to provide a fixed compressor, removed from a movable infrared detection device, with suitable flexible lines for carrying the high pressure gas from the fixed compressor to the movable device and for carrying the flow pressure gas from the device back to the compressor.

Another object of the device is to provide a compact expansion valve or cryostat which is less than 2½ inches long and has a nominal diameter of about ¼ inch.

Other objects, features, and advantages of the invention will hereinafter be made apparent to those skilled in the art, in the following description of an exemplary embodiment incorporating the invention, reference being made to the appended drawings forming a part of the description, in which drawings:

FIG. 3 is an enlarged view of the novel flexible line shown in FIG. 2 with the infrared detection element and enclosure, shown schematically;

FIG. 4 is an enlarged, partial section of the expansion valve mounted at one end of the flexible line shown in FIG. 3;

FIG. 5 is an end view in partial section of the expansion valve shown in FIG. 4; and FIG. 6 is an enlargement of a small fragment of the finned tube used in the expansion valve.

Figure 1:
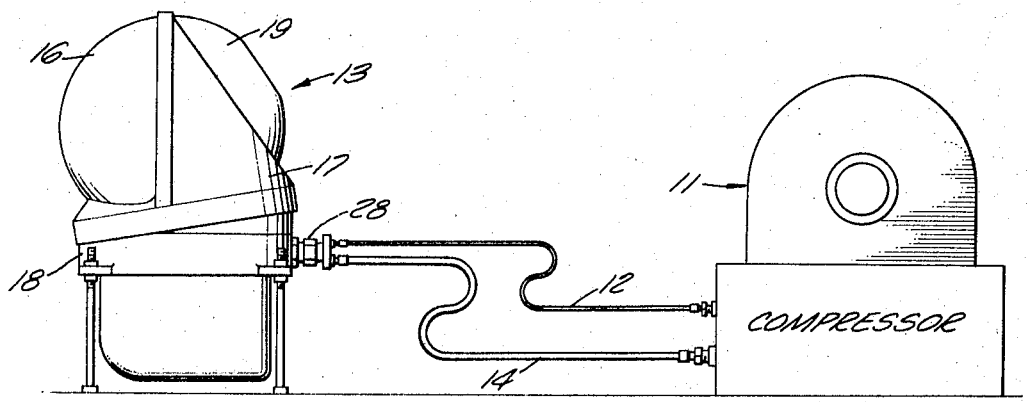
FIG. 1 is a schematic illustration of a closed-loop system showing a compressor supplying high pressure nitrogen to the infrared radiation detection device.

Referring to the drawings and to FIG. 1 in particular, there is shown a typical compressor 11 which compresses nitrogen to about 2,000 pounds per square inch pressure. The compressed, high pressure nitrogen is conducted through a tube 12, made of, for example, stainless steel, to an infrared radiation detection device 13. Within the device 13 the nitrogen expands in a manner to be hereinafter described, and absorbs heat from the device. The low pressure nitrogen is conducted through another tube 14, made of, for example, stainless steel, back to the compressor 11 where the nitrogen is again compressed and discharged into tube 12. The infrared radiation detection device 13 has a hemispherical window 16, which is transparent to infrared rays, and the window 16 is mounted on a metallic enclosure 17. A spherical cover 19 is also mounted on the enclosure 17 for access therein, and a suitable stand 18 supports the enclosure 17.

Figure 2:
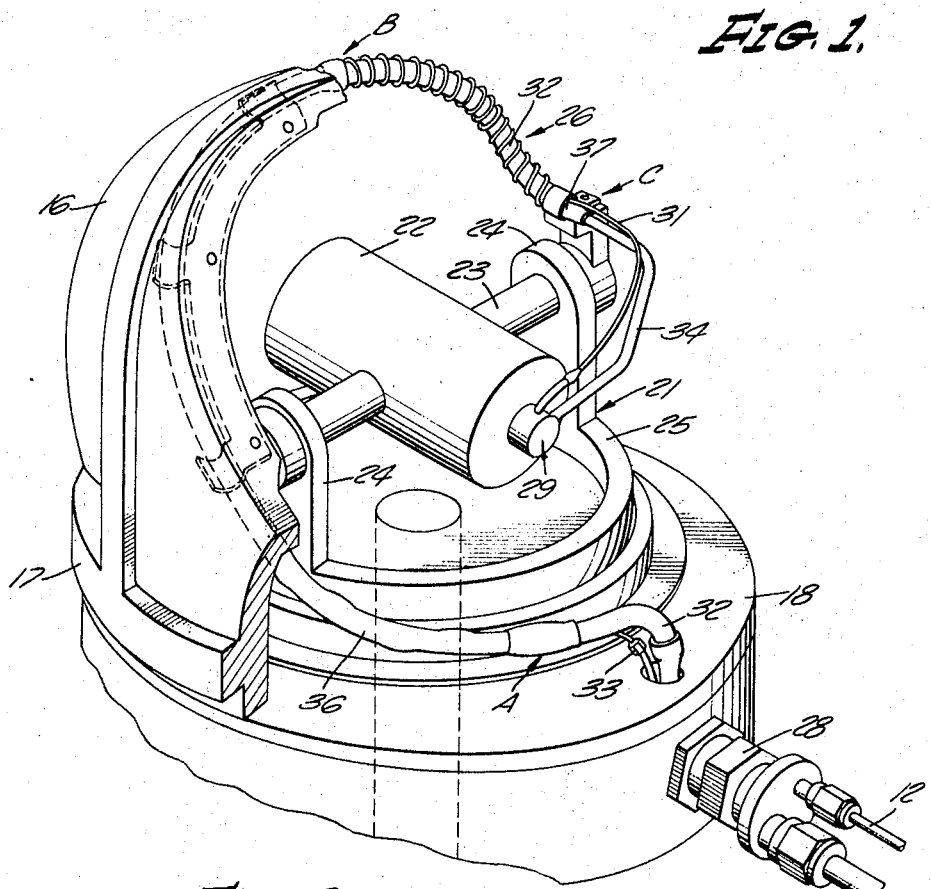
FIG. 2 is a pictorial enlarged view of the detection device with the cover and other minor elements removed showing the basic structure in combination with the invention.

Referring to FIG. 2, the device is shown with the cover 19 removed from the enclosure 17 and with the window 16 and enclosure 17 partially broken away, exposing the inside of the device 13. Mounted on stand 18 and within enclosure 17 is a gimbal 21 which allows a detection element enclosure 22 to rotate within a solid angle of, for example, 120°. The enclosure 22 is mounted on a shaft 23 which is disposed to rotate about a horizontal axis. In turn the shaft 23 is bearing-mounted to the two upright arms 24 of a yoke 25. Yoke 25 is suitably mounted to stand 18 to rotate about a vertical axis which passes through the horizontal axis about which the enclosure 22 rotates. In a manner to be described hereinafter, the interior of the enclosure 22 is maintained at a low temperature by the high pressure nitrogen which is supplied by novel flexible line 26 to a specially constructed cryostat 29. The line 26 is connected between a fitting 28 on stand 18 and the cryostat 29 disposed within the enclosure 22. The line 26 is constructed so that it transports high pressure nitrogen from tube 12 to the cryostat 29 and low pressure nitrogen from the cryostat 29 to tube 14 without interfering with the rotation, inertia, or center of gravity of the gimbal 21. The cryostat 29 is constructed so that it is of minimum size and compactness and still produces a low temperature, for example, liquid nitrogen temperature.

Referring to FIG. 3, the flexible line 26 is shown enlarged and in more detail. The line 26 includes two separate tubes, a high pressure tube 31 made of, for example, stainless steel and having a diameter of .04 inch and a wall thickness of .005 inch, and a low pressure tube 32 made of, for example, soft rubber for flexibility and having a diameter of .38 inch and a wall thickness of .03 inch. At one end, the high pressure tube 31 has a suitable fitting 33 which connects to fitting 28 (FIG. 2), and, at the other end, the tube 31 connects to the cryostat 29. Low pressure tube 32 is also connected to fitting 28 and to a metallic tube 34 which is in turn connected to the cryostat 29. As shown in the drawing, the tube 31 is wound around the flexible tube 32 to provide mutual support between the two tubes. From a region A to a region B on the flexible line 26, the helical pitch of the high pressure tube 31 around the tube 32 is large thereby providing little flexibility to this portion. Flexibility in this portion is not required since it is mounted onto and in fixed relationship to the underside of enclosure 17 as shown in FIG. 2. However, from region B (FIG. 3) to a region C the helical pitch of the high pressure tube 31 around the tube 32 is small, for example .07 inch per turn thereby providing great flexibility. The region C on the line 26 is mounted on the shaft 23 of gimbal 21 as shown in FIG. 2, whereby the portion of the line 26 between regions B and C is freely suspended under the enclosure 17. Therefore, the flexible tube 32 prevents the closely wound helical section of tube 31 from sagging, and the helical section of tube 31 prevents the flexible tube 32 from bursting. Since flexibility is not needed between regions A and B, the tubes 31 and 32 are wrapped with a plastic wrap 36 which prevents motion between the two tubes. However, between regions B and C no wrap is provided and the tube 31 is free to move relative to tube 32 to provide maximum flexibility. Flexibility is not needed between region C and the valve 29 and, therefore, the metallic tube 34 is used to transport the low pressure nitrogen. As will be hereinafter explained the cryostat 29 is compacted into as small a space as possible and therefore the brazed connection between the cryostat 29 and tube 34 provides compactness better than the sleeve connection between the rubber tube 32 and metallic tube 34. A plastic sleeve 37 made of a suitable plastic that shrinks when heated ensure that a seal is formed between the rubber tube 32 and metallic tube 34. The enclosure 22 is schematically shown enclosing a standard infrared detection element 35 (shown schematically). The element 35 includes a vacuum envelope with an axial bore of about ¼ inch diameter. The cryostat 29 is made sufficiently small so that it fits within the bore and is sufficiently short so that it does not protrude too far out of the enclosure 22 and interfere with the flexibility of the system. Besides the above requirements the cryostat 29 had to produce liquid nitrogen.

Referring to FIGS. 4, 5, and 6, there is illustrated the cryostat 29 which is of minimum size and capable of producing liquid nitrogen. The cryostat 29 includes a mandril 41 having a diameter of, for example, .083 inch upon which is wound a finned tube 38 made of, for example, stainless steel and having an outside diameter of .022 inch and an inside diameter of .012 inch. The center portion, for example, the center 17 inches, of the tube 38 has a helically wound cooling fin 39 (FIG. 6) that has a pitch of, for example, 80 turns per inch. The fin 39 has a width that is about 3 times longer than its thickness to provide maximum heat transfer surface. The fin 39 is made of, for example, copper, because it has high coefficient of heat conductivity and the size of the fin is, for example, .004 inch thick and .012 wide. Thus the overall diameter of the center portion of tube 38 with the fin 39 is about .046 inch. Since the tube 38 and the fin 39 are made of dissimilar metals, the two metals are assembled in the following manner. The center portion (a length of 17 inches) of tube 38 is plated with a thin layer of copper (.0002 inch) and then plated with the same thickness of silver, thus providing a portion of the brazing metal. Then the copper fin 39 which has a rectangular cross-section is wound on the tube 38 with the required pitch and the width of the fin 39 extending radially. After the fin 39 is wound on the tube 38, the tube 38 and fin 39 are plated with silver forming more brazing material to ensure a good bond between the tube and fin. Then the combination is heated in an oven until a silver-copper eutectic is formed and flows to form filets 50 at the base of the fin 39. The copper and silver plating on tube 38 should not be too thick because, when the eutectic is formed, the spacing between the tube 38 and fin 39 would be too large to hold the molten metal and form the filets 50 continuously between the fin and tube.

One end 38a of tube 38 is wrapped for example, twice around the end of the mandril 41 to extend outside of the cryostat 29 and connect with tube 31 (see FIG. 5). The central or finned portion of tube 38 is helically wound around the mandril 41 with each wrap lying adjacent the next wrap. Within the helical void formed by the finned tube 38 and the mandril 41 there is wound, for example, a flexible line 40 made of, for example, a polyester plastic such as nylon, to form a seal against the mandril 41. Within the external helical void formed around the finned tube 38 is wound another flexible line 44, made of, for example, nylon. Onto the other end of tube 38 is connected a capillary tube 42 having, for example, an outside diameter of .010 inch and an inside diameter of .005 inch. Thus, the two tubes are connected by inserting tube 47 into the end of tube 38 a short distance and brazing. The tube 42 is closely wound in a single layer, for example, ten turns to the end of the mandril 41 and then back onto itself seven turns to terminate and forming an orifice 42a which is disposed near the tube 38 for reasons that will be hereinafter explained.

The assembly consisting of tubes 38 and 42 wound on the mandril 41 is enclosed by a lower valve enclosure 45 and an upper valve enclosure 46 which are sealed together with a cold pressure seal 47 so that the nylon lines 40 and 44 are not damaged as they would be if brazing heat had been applied to form a seal. Therefore, before the assembled mandril is enclosed within either enclosure 45 or 46, all brazing operations are performed on the enclosures 45 and 46. Thus, with the assembled mandril removed from the enclosures 45 and 46, tubes 34 and 48 are suitably brazed to the upper enclosure 46. Also, a copper tip 49 and a T-flange 51 is brazed to a sleeve 52 having a diameter of, for example .2 inch to form the lower enclosure 45. Next, the parts are assembled by threading tube 38a through a bore 53 (FIG. 4) formed in enclosure 46 and through tube 48. Tube 48 is larger than tube 38 to allow tube 38 to move freely therethrough. The mandril 41 is co-axially aligned within enclosure 46 and enclosure 46 is placed over the other end of the mandril 41 and tubes 38 and 42. Between the flange formed on enclosure 46 and the T-flange 51 is placed a nylon washer 54, and a soft metal U-shape clip 56 made of, for example, copper, is pressed over the flanges forming the pressure seal 47 therebetween. Finally, the tube 31 is placed around the portion of the tube 38 extending out of tube 48, and tubes 31 and 48 are brazed to tube 38 as shown. Tube 48 is sufficiently long so that the brazing heat is not conducted to the nylon lines 40 and 44. The axial spacing between the end of sleeve 52 and enclosure 46 is made as small as practical making the overall length of the cryostat as small as possible. Then to provide a duct of sufficient size to conduct the low pressure nitrogen tube 34 without any appreciable pressure drop, an annular space 57 is provided around the sleeve 52. Thus, the heat exchange portion of the cryostat comprising the finned portion of tube 38 extends on both sides of the pressure seal 47 to provide maximum heat exchange area within a given volume without damaging the nylon lines 40 and 44. The function of the nylon lines is to force the low temperature nitrogen from the walls of the mandril 41 and sleeve 52 into better contact with fin 39. The orifice 42a is spaced from point 58 so that liquid nitrogen can be deposited within the copper tip 49 and not be blown out by the incoming nitrogen.

Thus, the infrared radiation detection element is maintained at a very low temperature, for example, liquid nitrogen temperature. The infrared rays, contained within a cone having a solid angle of about 120° and entering the window 16, can be readily detected. The detection element 22 is free to rotate within this solid angle so that the intensity of radiation from various angles can be measured. The novel flexible line and cryostat increase the efficiency and decrease the size of the device.

With the present disclosure in view, modification of the invention will appear to those skilled in the art. Accordingly, the invention is not limited to the exact details of the illustrated preferred embodiment but includes all such modification and variations coming within the scope of the invention as defined in the appended claims.

What is claimed is:
1. In combination, a compressor for receiving and compressing a refrigerant,
 an element to be refrigerated including an expansion valve,
 a gimbal for supporting said element to cause said element to rotate through a solid angle of at least 90°,
 a mount for supporting said gimbal and said element and disposed in fixed relationship with said compressor,
 a high pressure line for transporting high pressure refrigerant from said compressor to said mount and a low pressure line for transporting low pressure refrigerant from said mount to said compressor,
 a flexible line having a high pressure tube and a low pressure tube coupled to said high pressure line and said low pressure line, respectively at one end and coupled to said expansion valve at the other end allowing said element to rotate freely on said gimbal while being refrigerated.

2. In the combination of claim 1, wherein:
 said low pressure tube is made of a flexible pliable material,
 said high pressure tube is helically wound around said low pressure tube so that said low pressure tube and said high pressure tube support each other.

3. In the combination of claim 2, wherein:
 said expansion valve is metallic,
 a metallic tube, communicating with said valve,
 said low pressure tube is coupled to and communicates with said metallic tube,
 pressure sealing means over the portion of said low pressure tube in contact with said metallic tube to form a seal therebetween, and
 said high pressure tube extends into said valve for allowing said refrigerant to expand and then exit the valve through said metallic tube.

4. In the combination of claim 3, wherein:
 said valve includes a hollow tubular element and a mandril disposed internally thereof and fixed to one end;
 said metallic tube is connected at said one end thereof,
 said high pressure tube extends into said hollow tubular element, is helically wound around said mandril and terminates at the other end thereof and within said tubular element so that the refrigerant exits from said high pressure tube, expands into said hollow element, flows across said high pressure tube, and out of said tubular element through said metallic tube.

5. In the combination of claim 4 wherein:
 cooling fins are provided on portions of the high pressure tube disposed within said tubular element to increase the rate of heat exchange between the refrigerant within the high pressure tube and the refrigerant outside the high pressure tube.

6. In the combination of claim 1 wherein said expansion valve includes:
 a mandril,
 a finned tube helically wound around said mandril, and having an orifice formed at one end,
 a first enclosure disposed over a portion of the mandril and covering a portion of the finned tube,
 a second enclosure disposed over the remaining portions of the mandril and the finned tube, and
 a pressure seal formed between said first and second enclosures.

7. In the combination of claim 1 wherein said expansion valve includes:
 a mandril,
 a finned tube helically wound around said mandril and forming an orifice adjacent one end of the mandril,
 a first enclosure having a generaly cylindrical shape and closed at one end,
 a second enclosure having a thin wall metallic sleeve, and a metallic tip made of a metal having a higher heat conductivity rate than said sleeve, closing one end of said sleeve,
 said mandril and finned tube being disposed within said second enclosure with said orifice adjacent said metallic tip,
 said first enclosure being disposed over a portion of said sleeve and covering the mandril,
 a pressure seal formed between said first enclosure and said sleeve so that said finned tube extends from both sides of said seal, and
 means disposed in said closure for conducting high pressure refrigerant into said finned tube and conducting low pressure refrigerant out of said first enclosure.

8. An expansion valve for a cryogenic system having a suitable refrigerant, said valve comprising:
 a mandril,
 a finned tube helically wound around said mandril and forming an orifice adjacent one end of the mandril,
 a first enclosure disposed over the mandril and the finned tube,
 a second enclosure disposed with respect to said first enclosure to form an enclosure for the mandril and the finned tube, and
 a pressure seal formed between said first and second enclosures and disposed so that the passage of refrigerant therethrough is stopped and also disposed so that portions of the finned tube lie on opposite sides of said pressure seal to form a compact valve.

9. The expansion valve of claim 8 wherein:
 said first enclosure has a generally cylindrical shape and closed at one end;
 said second enclosure includes a thin wall metallic sleeve, and
 a metallic tip closing one end of said sleeve;
 said mandril and finned tube axially being disposed within said second enclosure with said orifice adjacent said metallic tip,
 said first enclosure is axially disposed over a portion of said sleeve and enclosing the mandril,
 said pressure seal is formed between said first enclosure and the sleeve of said second enclosure so that portions of the finned tube extend from both sides of the seal, and
 means disposed in said closure for conducting high pressure refrigerant into said finned tube and conducting low pressure refrigerant out of said first enclosure.

10. The expansion valve of claim 9 wherein:
said orifice includes a section of capillary tubing attached to and communicating with the finned tube,
said capillary tubing forming a plurality of turns on said mandril extending to the end thereof and returning back towards said finned tube so that the opening of said tubing is adjacent said finned tube.

11. The expansion valve of claim 9 wherein:
a first thin elongated member is helically wound around said mandril and disposed between two adjacent turns of the finned tube to force the flowing refrigerant from the wall of the mandril into heat conduction contact with the finned tube,
a second thin elongated member is helically wound around the finned tube and disposed between two adjacent turns of the finned tube to force the flowing refrigerant from the wall of said sleeve into heat conduction contact with the finned tube,
said first and second elongated members are made of a polyester material, and
said sleeve forms contact with the helically wound finned tube and said second elongated member.

12. The expansion valve of claim 11 wherein:
said orifice includes a section of capillary tubing attached to and communicating with the finned tube, and
said capillary tubing forming a plurality of turns on said mandril extending to the end thereof and returning back towards said finned tube so that the opening of the tubing is adjacent the finned tube.

13. The expansion valve of claim 12 wherein:
said finned tube includes a section without fins on the other end thereof from said orifice;
said first enclosure includes an annular space disposed around said sleeve and communicating with the interior of said sleeve,
said means for conducting refrigerant into said finned tube and out of said first enclosure includes a first radial bore formed in said first enclosure and communicating with said annular space and a second radial bore of smaller diameter than said first bore formed in said first enclosure and disposed so that said section of non-finned tube which communicates with the finned tube may extend between the end of the sleeve and the first enclosure and out of the second radial bore, and the diameter of said first radial bore being larger than the spacing between the sleeve and the end of said first enclosure.

14. In the combination of claim 1 wherein said expansion valve includes:
a mandril,
a finned tube helically wound around said mandril and forming an orifice adjacent one end of the mandril,
a first enclosure having a generally cylindrical shape and closed at one end;
a second enclosure having a thin wall metallic sleeve, and
a metallic tip closing one end of said sleeve;
said mandril and finned tube axially being disposed within said second enclosure with said orifice adjacent said metallic tip,
said first enclosure being axially disposed over a portion of said sleeve and enclosing the mandril,
a pressure seal being formed between said first enclosure and the sleeve of said second enclosure so that portions of the finned tube extend from both sides of the seal, and
means disposed in said closure for conducting high pressure refrigerant into said finned tube and conducting low pressure refrigerant out of said first enclosure,
a first thin elongated member being helically wound around said mandril and disposed between two adjacent turns of the finned tube to force the flowing refrigerant from the wall of the mandril into heat conduction contact with the finned tube,
a second thin elongated member being helically wound around the finned tube and disposed between two adjacent turns of the finned tube to force the flowing refrigerant from the wall of said sleeve into heat conduction contact with the finned tube,
said first and second elongated members are made of polyester material, and
said sleeve forms contact with the helically wound finned tube and said second elongated member,
said finned tube having a section without fins on the other end thereof from said orifice,
said first enclosure having an annular space disposed around said sleeve and communicating with the interior of said sleeve,
said means for conducting refrigerant into said finned tube and out of said first enclosure including a first radial bore formed in said first enclosure and communicating with said annular space and a second radial bore of smaller diameter than said first bore formed in said first enclosure and disposed so that said section of non-finned tube which communicates with the finned tube may extend between the end of the sleeve and said first enclosure and out of the second radial bore,
the diameter of said first radial bore being larger than the spacing between the sleeve and the end of said first enclosure, and
said orifice including a section of capillary tubing attached to and communicating with the finned tube,
said capillary tubing forming a plurality of turns on said mandril extending to the end thereof and returning back towards said finned tube so that the opening of the tubing is adjacent the finned tube.

15. In the combination of claim 2 wherein said expansion valve includes:
a mandril,
a finned tube helically wound around said mandril and forming an orifice adjacent one end of the mandril,
a first enclosure having a generally cylindrical shape and closed at one end;
a second enclosure having a thin wall metallic sleeve, and
a metallic tip closing one end of said sleeve;
said mandril and finned tube axially being disposed within said second enclosure with said orifice adjacent said metallic tip,
said first enclosure being axially disposed over a portion of said sleeve and enclosing the mandril,
a pressure seal being formed between said first enclosure and the sleeve of said second enclosure so that portions of the finned tube extend from both sides of the seal, and
means disposed in said closure for conducting high pressure refrigerant into said finned tube and conducting low pressure refrigerant out of said first enclosure,
a first thin elongated member being helically wound around said mandril and disposed between two adjacent turns of the finned tube to force the flowing refrigerant from the wall of the mandril into heat conduction contact with the finned tube,
a second thin elongated member being helically wound around the finned tube and disposed between two adjacent turns of the finned tube to force the flowing refrigerant from the wall of said sleeve into heat conduction contact with the finned tube,
said first and second elongated members are made of polyester material, and
said sleeve forms contact with the helically wound finned tube and said second elongated member,
said finned tube having a section without fins on the other end thereof from said orifice, said first enclosure having an annular space disposed around said sleeve and communicating with the interior of said sleeve, said means for conducting refrigerant into said finned tube and out of said first enclosure including a first radial bore formed in said first enclosure and communicating with said annular space and a second radial bore of smaller diameter than said first bore formed in said first enclosure and disposed so that said section of non-finned tube which communicates with the finned tube may extend between the end of the sleeve and said first enclosure and out of the second radial bore, the diameter of said first radial bore being larger than the spacing between the sleeve and the end of said first enclosure, and said orifice including a section of capillary tubing attached to and communicating with the finned tube, said capillary tubing forming a plurality of turns on said mandril extending to the end thereof and returning back towards said finned tube so that the opening of the tubing is adjacent the finned tube.

16. In the combination of claim 15 wherein said finned tube comprises:
 a metallic tube having a cylindrical outer wall,
 a rectangular metallic fin having a width of greater dimension than its thickness and being helically wound on said metallic tube so that the width thereof extends radially from said metallic tube; and
 a suitable brazing material for brazing said metallic fin to said metallic tube to provide a heat conduction path between the two which path is continuously for the length of the fin.

References Cited
UNITED STATES PATENTS

| | | | |
|---|---|---|---|
| 2,951,944 | 9/1960 | Fong | 62—514 |
| 3,018,643 | 1/1962 | Evers | 62—514 |
| 3,055,192 | 9/1962 | Dennis | 62—514 |
| 3,188,824 | 9/1962 | Geist et al. | 62—514 |

LLOYD L. KING, *Primary Examiner.*